P. H. JOHNSON.
MEANS OF SUSPENSION OF VEHICLES.
APPLICATION FILED MAY 12, 1919.
1,329,769.
Patented Feb. 3, 1920.
3 SHEETS—SHEET 3.
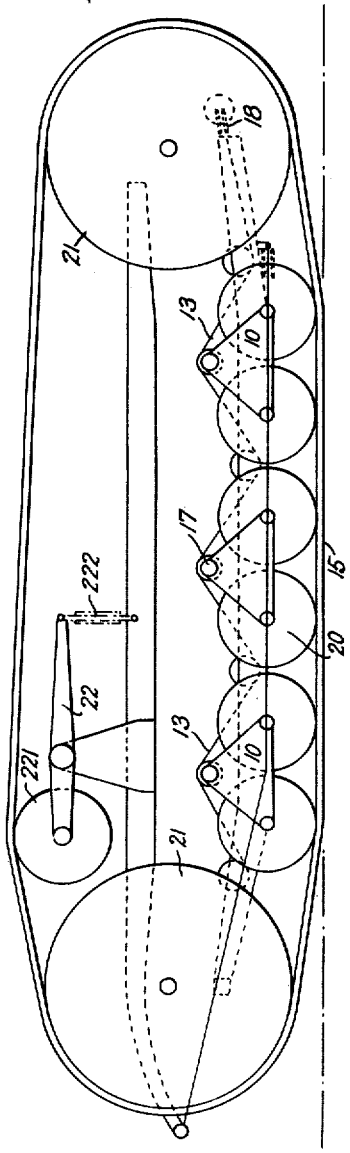
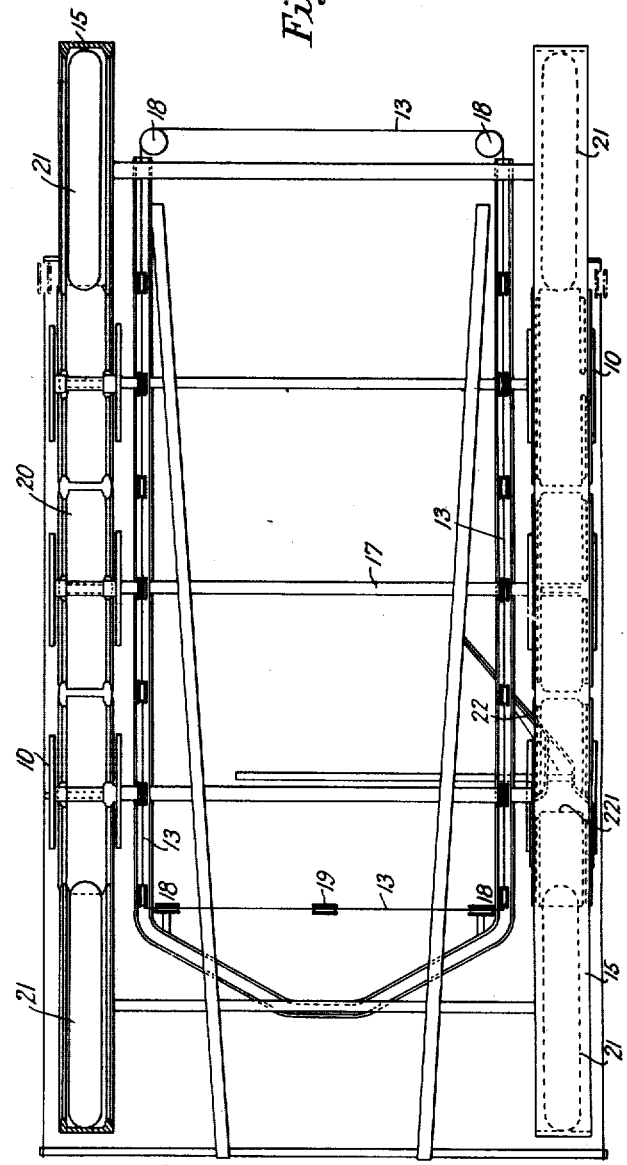

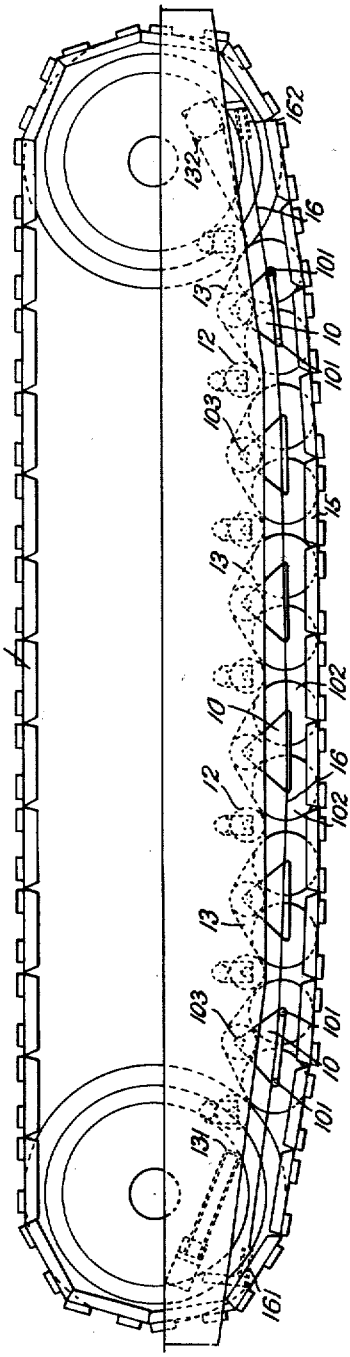

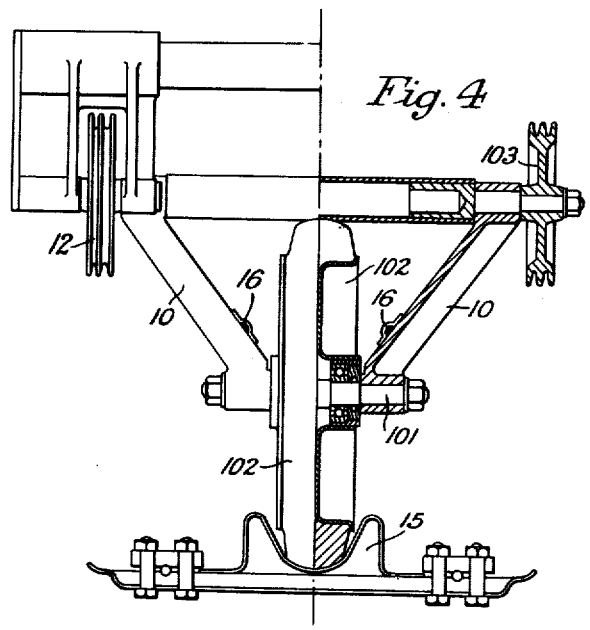
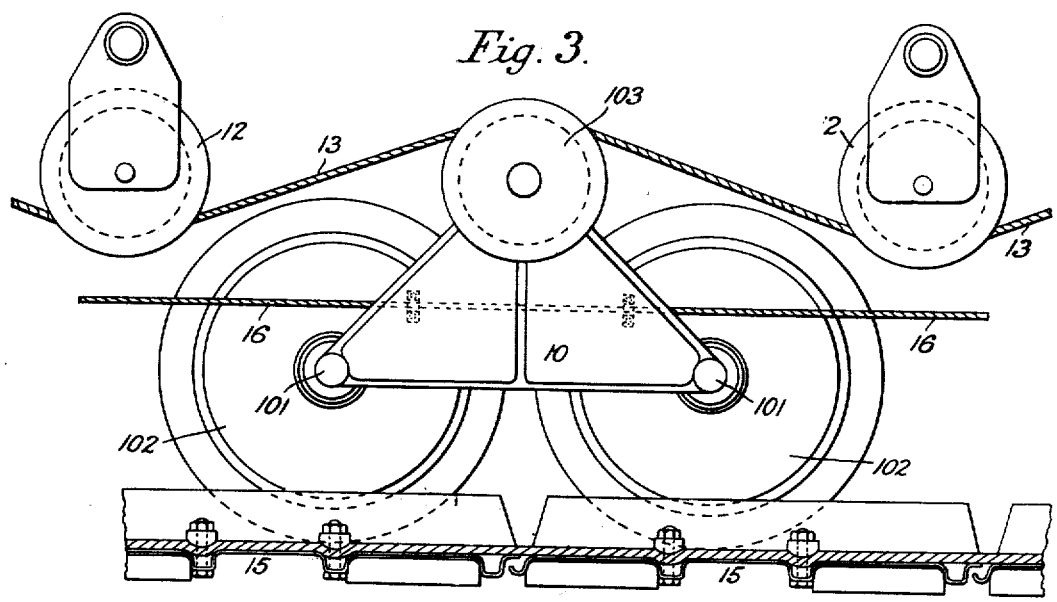

UNITED STATES PATENT OFFICE.

PHILIP HENRY JOHNSON, OF BECKENHAM, ENGLAND.

MEANS OF SUSPENSION OF VEHICLES.

1,329,769.     Specification of Letters Patent.     Patented Feb. 3, 1920.

Application filed May 12, 1919. Serial No. 296,562.

*To all whom it may concern:*

Be it known that I, PHILIP HENRY JOHNSON, a subject of the King of Great Britain, residing at St. Barnabas Vicarage, Beckenham, Kent, England, have invented new and useful Improvements in Means of Suspension of Vehicles, of which the following is a specification.

This invention relates to improved means of suspension of vehicles and especially vehicles of the endless track type or those having an articulated track or independent track shoes, but it is also applicable to vehicles such as railway vehicles in which the axles are guided by horn plates.

The object of the invention is to provide an effective suspension for a variety of types of vehicles (whether designed to run on rails, roads or across open country) which will absorb shock caused by obstacles, undulations or irregularities of the surface traveled over, and distribute by compensation the load due to the weight of the vehicle over the various points of support.

In this specification the word "rope" is used to describe any flexible connection.

According to this invention a plurality of pulleys is mounted in a plane at intervals along the vehicle and a plurality of other pulleys is arranged alternately to the first set, and a rope is passed under the pulleys of one set and over the pulleys of the other set alternately. The rope may be secured to the vehicle or may be endless passing around the vehicle and springs may be provided to increase the elasticity of the system and diminish shock to the rope.

One set of pulleys may be carried on bogies having small wheels or rollers running on an endless track, which bogies on opposite sides of the vehicle may be rigidly connected together or adjacent bogies at each side of the vehicle may be flexibly connected together. More than one rope is usually employed, pulleys to carry them being arranged accordingly.

The drawings illustrate apparatus made in accordance with this invention.

Figure 1 is a side elevation and Fig. 2 is a transverse section. Fig. 3 is a side elevation and Fig. 4 is an end elevation partly in section of the same apparatus, both to a larger scale. Figs. 5 and 6 are a side elevation and a plan of a vehicle in which bogies on opposite sides are connected together, while Fig. 7 is an end view.

In Figs. 1 to 4, a number of bogies 10 have two axles 101 on which are wheels 102 running on an endless track 15 and on each bogie 10 are two double pulleys 103 and on the vehicle are two sets of pulleys 12, ropes 13 being secured to the vehicle at 131 and 132 passing over the pulleys 103 and under the pulleys 12. The bogies 10 are connected together by ropes 16 both ends of which are secured to the vehicle by means of springs, 161 and 162 respectively. The bogies 10 float sidewise on the ropes between the pulleys 12 and the arrangement permits of steering without skidding that portion of the track in contact with the ground and bearing the weight of the vehicle.

In Figs. 5, 6 and 7, the bogies 10 are arranged in a similar manner to those in Figs. 3 and 4 opposite bogies being connected together by shafts 17. One suspension rope 13 is required which is endless passing around pulleys 18 at the ends of the vehicles while at the rear end the rope passes around other pulleys 19 at the end of an arm 191 (see Fig. 7) whose movement is controlled by a spring 192. The endless tracks 15 are driven by wheels 21 and pass under the wheels 20 on the vehicle, and pivoted arms 22 having rollers 221 on one end bear against the tracks 15 to take up any slack under influence of springs 222 at the other end of the arms.

What I claim is:—

1. A vehicle body having supports beneath it, equipped with pulleys mounted on said body and supports to turn about horizontal axes, and a rope connected with the vehicle body and passing over and under the pulleys to yieldingly sustain the vehicle body on said supports.

2. A vehicle body having supports beneath it, equipped with a set of pulleys mounted on the body to turn about horizontal axes and another set of pulleys mounted on the supports to turn about horizontal axes, and a rope connected to the vehicle body and passing over and under the pulleys to yieldingly sustain the vehicle body.

3. A vehicle combined with a plurality of pulleys arranged at intervals along the lower portion of the vehicle, a plurality of other pulleys on the vehicle supports arranged alternately to the first set and a rope passing under the pulleys of one plurality and over the pulleys of the other plurality alternately.

4. A vehicle combined with a plurality of pulleys arranged at intervals along the vehicle, a plurality of other pulleys arranged alternately to the first set and carried on bogies running on an endless track and a rope passing under the pulleys of one plurality and over the pulleys of the other plurality alternately.

5. A vehicle combined with a plurality of pulleys arranged at intervals along the vehicle, a plurality of other pulleys arranged alternately to the first set and carried on bogies running on an endless track, a flexible connection between adjacent bogies and a rope passing under the pulleys of one plurality and over the pulleys of the other plurality alternately.

6. A vehicle combined with a plurality of pulleys arranged at intervals along the vehicle, a plurality of other pulleys arranged alternately to the first set and carried on bogies running on an endless track, a flexible connection between adjacent bogies, a rigid connection between bogies on opposite sides of the vehicle, and a rope passing under the pulleys of one plurality and over the pulleys of the other plurality alternately.

In testimony that I claim the foregoing as my invention I have signed my name this 23rd day of April, 1919.

PHILIP HENRY JOHNSON.